March 18, 1941. C. B. CUSHWA ET AL Re. 21,752

LINER SEGMENT

Original Filed April 30, 1938

INVENTORS
Charles B. Cushwa
and Thomas L. White
by their attorneys
Stebbins and Blenko Reissued Mar. 18, 1941

Re. 21,752

UNITED STATES PATENT OFFICE 21,752

LINER SEGMENT

Charles B. Cushwa and Thomas L. White, Youngstown, Ohio, assignors to The Commercial Shearing & Stamping Company, a corporation of Ohio Original No. 2,181,508, dated November 28, 1939, Serial No. 205,304, April 30, 1938. Application for reissue April 20, 1940, Serial No. 330,800

5 Claims. (Cl. 61—45)

This invention relates to linings for earth borings and, in particular, to a liner segment adapted to be formed from steel plate and to be assembled end to end with other similar segments forming continuous lining rings. Such rings are assembled side by side in a manner to form a complete lining.

Numerous forms of liner segments have been proposed heretofore and it is the principal object of our invention to improve upon the segments which have been used previously both from the standpoint of economy of manufacture and ease and convenience in erection, while at the same time providing a segment of ample strength to support the load to which linings are usually subjected.

Linings for earth borings are subject to certain well defined forces, such as ring thrust, ring bending, bending of segments, etc. Ring thrust is the circular thrust going around the ring setting up compression stresses in the metal. This ring thrust is distributed over the sectional area of the segment and must be transmitted across the joints between the segments of each ring. Bending is caused by unequal loading of the ring and is resisted by the section modulus of the segment. The joints between segments of each ring must be strong enough to withstand the bending force. Staggering of the joints in the adjacent courses is of assistance in this respect, each course acting as a splice for the adjacent course. Local bending of individual segments is resisted by the section modulus of the segments taken circumferentially of the lining. It will be seen, therefore, that the strength of the joints is of extreme importance.

In a preferred form of the invention, our liner segment comprises a curved plate having stiffening corrugations extending therealong, preferably though not necessarily throughout the entire length thereof. Each segment is overlapped by one of the other adjacent segments. These structural features provide the strength necessary to resist the forces above mentioned. We provide means for rigidly connecting the segments end to end, as will be described in greater detail hereafter, with reference to the accompanying drawings illustrating a preferred embodiment. In the drawing.

Figure 1:
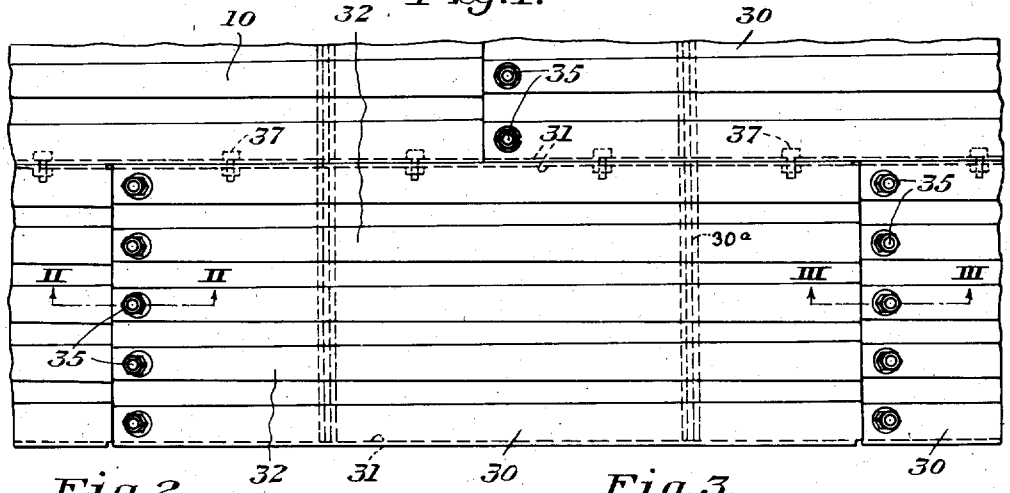
Fig. 1 is a partial plan view of a lining composed of segments according to our invention.

Referring now in detail to the drawing, a lining for a tunnel or the like in accordance with the invention is indicated generally at 10. The lining is composed of segments 30 assembled end to end to form rings. These rings are built up in side by side relation to the desired length within the tunnel or other boring.

Figure 2:
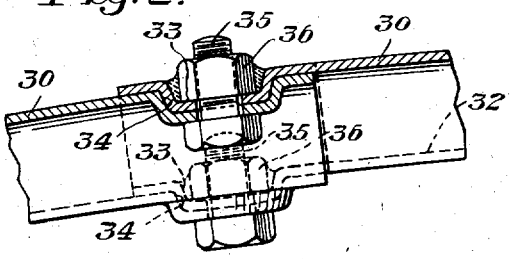
Fig. 2 is a partial sectional view taken along the line II—II of Fig. 1.
Figure 3:
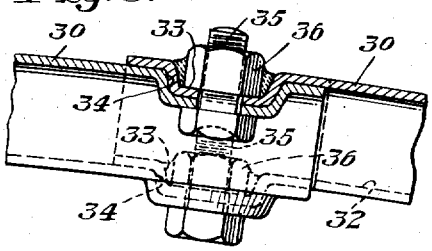
Fig. 3 is a similar view taken along the line III—III of Fig. 1.
Figure 4:
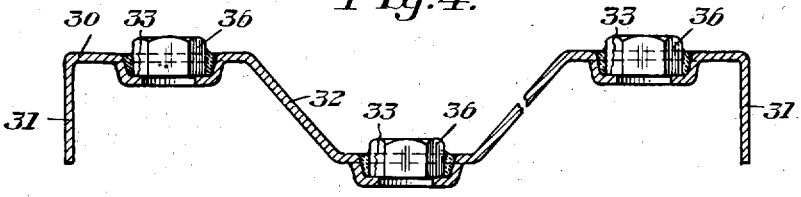
Fig. 4 is a radial sectional view taken through a segment along the line of the bolt holes adjacent one end.
Figure 5:
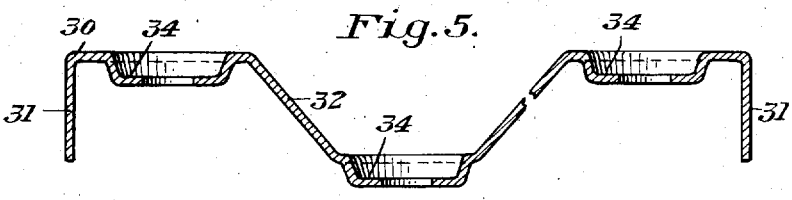
Fig. 5 is a similar view taken along the line of the bolt holes adjacent the other end.

The segments 30, with side walls 31 and corrugations 32 extending throughout the length thereof, are produced by suitably shaping steel plates. Each segment 30 is curved longitudinally and has intermediate transverse reinforcing members **30*a*. Opposite ends of each segment are provided with frusto conical depressions or protuberances 33 and 34 so shaped and dimensioned that they form mating portions, as shown in Figs. 2 and 3, when the ends of adjacent segments are lapped for connection as by bolts 35 extending through alined holes in the depressions 33 and 34. The depressions are preferably formed in the bottoms of the troughs formed by the corrugations which are substantially flat. For convenience in assembling the segments, nuts 36 are welded in the depressions 33 at one end of each segment. The bolts 35 may thus be inserted from inside the lining and screwed home tight without any difficulty. Bolts 37 extending through alined holes in side walls 31** serve to connect adjacent rings of the lining.

It will be apparent from the foregoing description that the segment shown in the drawing makes it possible, at relatively low cost, to provide a strong, rigid lining for earth bores characterized by tight joints and relatively light weight. The facility with which the lining may be erected is a further important advantage because the work of assembly is performed within the lining where working space is very limited.

The segment shown is also characterized by the additional advantage of still lower cost in that no end walls are employed. The mating recesses 33 and 34 make the end-to-end joints efficient in transmitting thrust and the bolts passing through the crests and troughs of the corrugations are likewise very efficient in transmitting bending stress.

Figure 6:
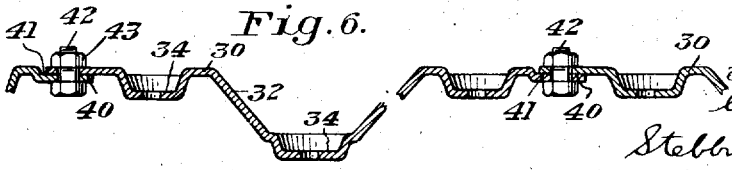
Fig. 6 is a transverse sectional view showing a modification.

A further form of the invention is illustrated in Fig. 6. This form is similar to that of Figs. 1 through 5 in all respects except that it has no side wall as such, the edges of the segments of adjacent rings being lapped as at 40, one edge of each segment being pressed downwardly as at 41 to permit such lapping. The lapped edges are connected by bolts 42 and the nuts 43 cooperating therewith may be welded to the edges of the segments in alinement with the bolt holes to facilitate assembly.

While we have illustrated and described herein only a preferred form of the invention with a modificaton thereof, it will be understood that various other changes in the invention disclosed may be made without departing from the spirit thereof or the scope of the appended claims.

We claim:

1. A liner segment comprising a skin plate curved along one dimension and having corrugations extending along said dimension, depressions formed adjacent one end of the plate and protuberances at the other, a pair of said segments being adapted to be assembled end to end in partly lapped relation wherein the protuberances at one end of a segment mate with the depressions in the end of the adjacent segment, said depressions and protuberances being disposed at the crests and troughs of said corrugations.

2. A lap joint connecting the edge of one plate to the edge of an adjacent plate, said plates being curved along their dimension perpendicular to their lapping edges and having corrugations extending in the direction of curvature, said joint including depressions spaced apart along the lapping edge of said one plate, protuberances similarly spaced along the lapped edge of the adjacent plate, said protuberances nesting in said depressions when the edge of said first-mentioned plate is in lapping relation to the edge of said adjacent plate with their corrugations nesting, and means securing the lapped edges of said plates together, said depressions and protuberances being tapered whereby they nest tightly.

3. A liner segment comprising a metal plate curved along one dimension and having corrugations extending in the direction of said dimension, forming open troughs exteriorly and interiorly of the segment, said troughs converging toward their bottoms whereby the ends of a pair of segments disposed in end-to-end, overlapping relation may be brought together and nested by sidewise movement, the ends of the corrugations being open to permit such nesting, and protuberances and depressions in the bottoms of said troughs adjacent the ends thereof, the protuberances on one segment being adapted to interfit with the depressions on another segment disposed in lapped, end-to-end, nesting relation therewith.

4. A liner segment comprising a metal plate curved along one dimension and having corrugations extending in the direction of said dimension, forming open troughs exteriorly and interiorly of the segment, said troughs converging toward their bottoms whereby the ends of a pair of segments disposed in end-to-end, overlapping relation may be brought together and nested by sidewise movement, the ends of the corrugations being open to permit such nesting, and protuberances and depressions in the bottoms of said troughs adjacent the ends thereof, the protuberances on one segment being adapted to interfit with the depressions on another segment disposed in lapped, end-to-end, nesting relation therewith, said protuberances and depressions having holes therein adapted to receive fasteners for securing adjacent plates together, the holes being so located as to be in alinement when the protuberances and depressions interfit.

5. A liner segment as defined by claim 3 characterized by nuts welded to the segments back of said protuberances.

CHARLES B. CUSHWA.
THOMAS L. WHITE.